United States Patent
Piety et al.

(10) Patent No.: US 7,222,888 B1
(45) Date of Patent: May 29, 2007

(54) PRECONDITIONED AIR CONDUIT

(75) Inventors: Brian Michael Piety, Vacaville, CA (US); Scott Takayuki Koizumi, Fairfield, CA (US)

(73) Assignee: Illinois Tool Works Inc., Glenview, IL (US)

( * ) Notice: Subject to any disclaimer, the term of this patent is extended or adjusted under 35 U.S.C. 154(b) by 193 days.

(21) Appl. No.: 11/123,792

(22) Filed: May 6, 2005

(51) Int. Cl.
*F16L 31/00* (2006.01)

(52) U.S. Cl. .................................. 285/260; 138/118

(58) Field of Classification Search ............... 285/260, 285/328; 138/156, 119, 118; 454/76
See application file for complete search history.

(56) References Cited

U.S. PATENT DOCUMENTS

| | | | |
|---|---|---|---|
| 5,368,341 A | 11/1994 | Larson | |
| 5,740,846 A | 4/1998 | Larson et al. | |
| 6,286,876 B1 | 9/2001 | Jasperse et al. | |
| 6,443,499 B1 | 9/2002 | Jenum | |
| 2001/0050480 A1 | 12/2001 | Gooch | |

FOREIGN PATENT DOCUMENTS

GB    1 212 589    11/1970

*Primary Examiner*—David Bochna
(74) *Attorney, Agent, or Firm*—Fletcher Yoder

(57) ABSTRACT

A conduit system is described for providing fresh air to aircraft positioned on the ground. The conduit system includes self-similar conduit sections having a female or connection end in a male or insertion end. The conduit sections may be back-compatible with existing fresh air conduits. The connection end forms sides or flaps joined by integral flexible bellows or gussets. The connection end thus forms a closed ring. The male end may be secured within the connection end by means of hook-and-loop fastener material and the connection end may be closed over the male end. The connection end is then completely closed by securement of extension tabs to an exterior surface of the connection end, thereby collapsing the integral bellows.

20 Claims, 5 Drawing Sheets

PRECONDITIONED AIR CONDUIT

BACKGROUND

The present invention relates generally to the field of conduits and conduit systems. More particularly, the application relates to a flexible conduit system for use in conveying preconditioned or fresh air to an aircraft when located on the ground.

A range of systems are commonly deployed for servicing aircraft when stationed on the ground. For example, electrical power supplies are commonly coupled to the aircraft, as are one or more sources of fresh air. Essentially, the ground power and air supplies enable the aircraft to function appropriately while stationed at a gate or other location without drawing upon the resources of the aircraft itself. For fresh air supplies a blower or air conditioning or ventilation unit is coupled to the aircraft via an elongated hose or conduit and a coupling that may be secured to an inlet on the aircraft. The blower moves air through the conduit, typically over the tarmac to the aircraft for circulation. A continuous supply of air is thus provided for the comfort of the passengers and crew.

Various systems have been developed for the conduits used to supply aircraft with fresh air. In general, while the application is, on its surface, relatively straightforward, it is demanding. Because the conduits are used outside, they must accommodate a range of weather and atmospheric conditions including heat and cold, wet, dry and even snow and ice. Moreover, the conduits are extremely rugged and robust, but can be rapidly and effectively deployed and connected to the aircraft. Conversely, the conduit can be moved away from the aircraft and stowed quickly and easily and in a relatively small volume.

Current designs for aircraft fresh air supply hoses often utilize individual sections of conduit that can be connected end-to-end. The conduits are commonly connected via zippers, snaps, and hook-and-loop fasteners. The latter arrangements provide a highly efficient and effective mechanism for securing successive links of conduit. However, existing designs are not without drawbacks.

One existing design for an aircraft conduit utilizes a hook-and-loop fastener arrangement in which a pair of flaps are provided on one end of the conduit in mutually-opposed relation. In opposite end of similar conduit sections has a closed ring or loop configuration around the entire circumference of which the opposite portion of the hook-and-loop fastener arrangement is sewn. The latter end, which may be referred to as the "male" end is positioned on one of the flaps of the opposite end of a mating conduit, and the other flap is pressed onto the male end to secure it in place. Slits on either side of the opposing flaps make this assembly possible. However, the slits must be closed by extensions that are provided on either side of one of the flaps. The arrangement is also somewhat susceptible to leakage at the location of the slits. Moreover, the flaps may become worn or even torn, as may the extensions on the single flap used to close the slits.

There is a need, therefore, for an improved system for delivering fresh air to aircraft when stationed on the ground. The system would ideally be back-compatible to some extent with existing conduit, but would solve certain drawbacks of the type described above.

BRIEF DESCRIPTION

The invention provides a novel arrangement for an aircraft fresh air supply conduit designed to response to such needs. The arrangement provides for self-similar conduit sections having what may be termed a "female" and an opposite "male" end, the latter being essentially identical to ends provided on existing conduits. The female end forms an open or generally frustoconical adapter that is closed around the male end of a mating conduit section. Essentially, the open female end may be expanded by closed bellows on either side of central flaps, eliminating the need for slits at those locations. The male end may be secured in place by hook-and-loop fastener material on both the flaps and on the male end. After securing the male end in place, the bellows provided on the female end may be collapsed by securing extensions or tabs on either side of the female end to an exterior surface of the female end. Securement of the extensions may also be accomplished by hook-and-loop fastener patches or portions provided on the extensions and on the external surface of the female end.

The resulting conduit arrangement facilitates connection of any number of conduit sections to one another in a substantially airtight manner. Sections may be made to any suitable length, and lengths of successive sections may be identical or different from one another. Moreover, diameters of the sections may be identical or may vary. By way or example, adapter sections may be provided which reduce or expand the effective diameter of the conduit section when inflated by moving fresh air. Similarly, adapter sections may be made that extend from a conduit section to an adapter or coupling, such as the coupling used to connect the conduits to an aircraft.

DRAWINGS

These and other features, aspects, and advantages of the present invention will become better understood when the following detailed description is read with reference to the accompanying drawings in which like characters represent like parts throughout the drawings, wherein.

Figure 6:
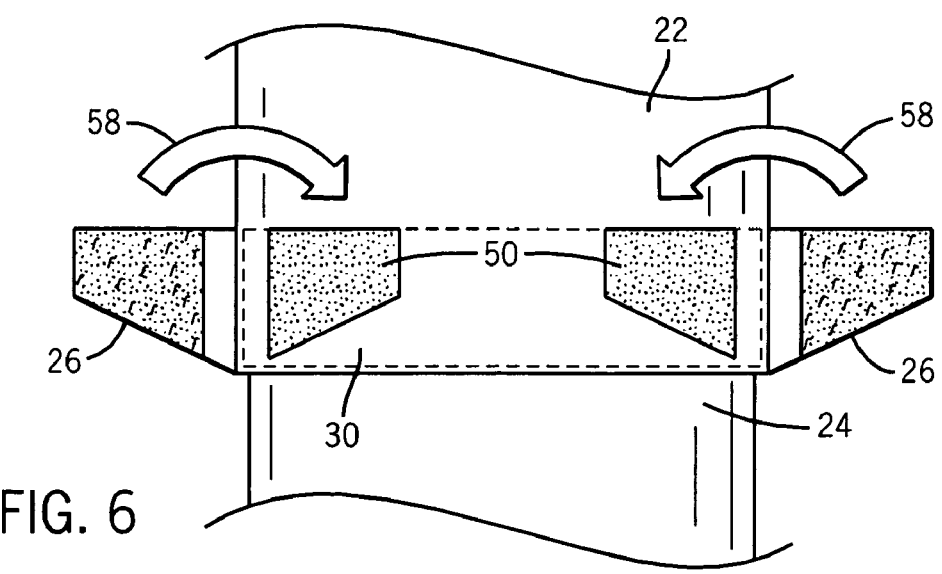
Figure 7:
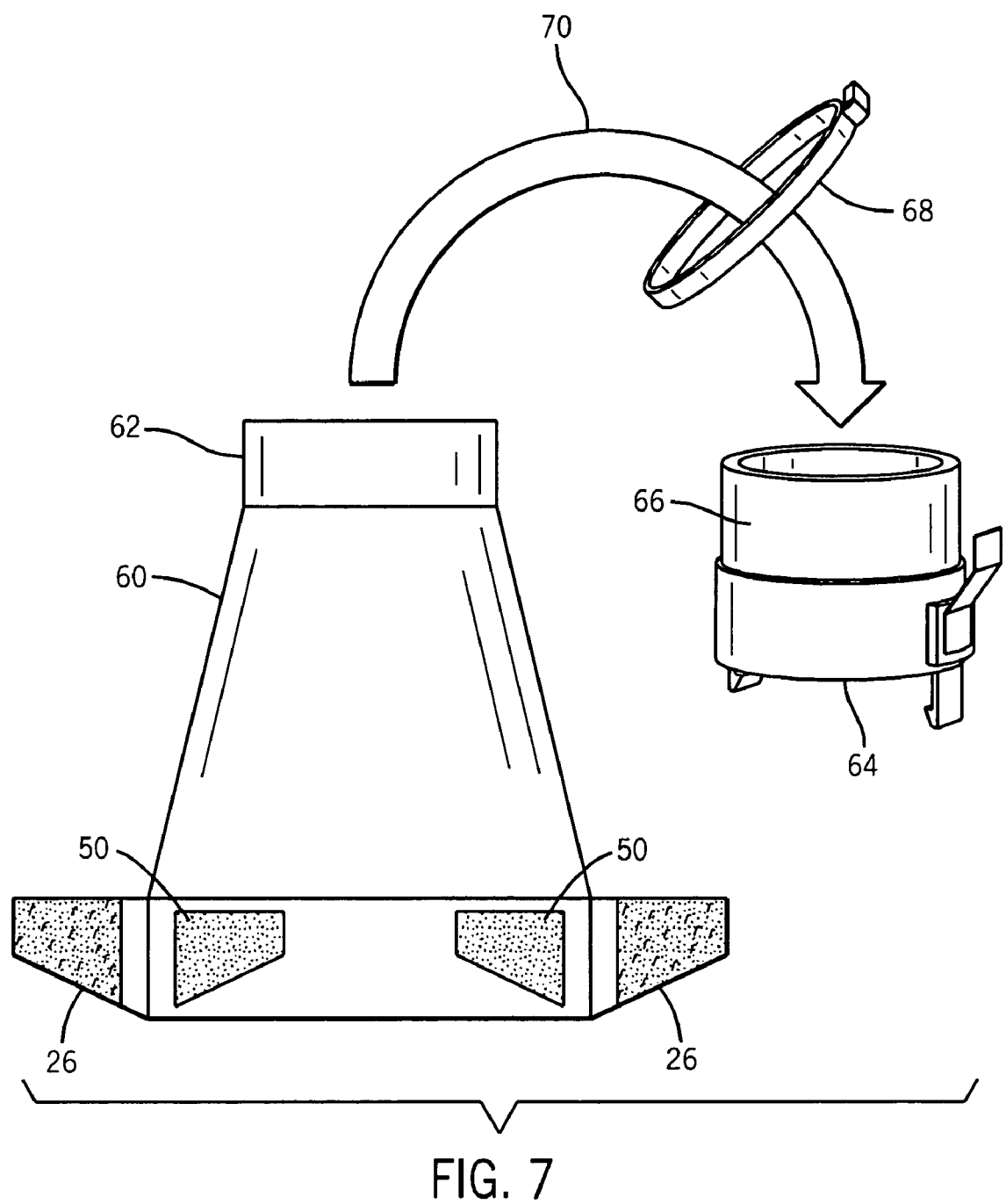

FIG. 6 is a plan view of a collapsed pair of mating conduit section illustrating a manner in which the female end is secured to close the assembly following securement of the male end within the female end; and FIG. 7 is an illustration of an adapter for a preconditioned air connector including a female end designed for securement to a mating male end in accordance with the construction of the present technique.

DETAILED DESCRIPTION

Figure 1:
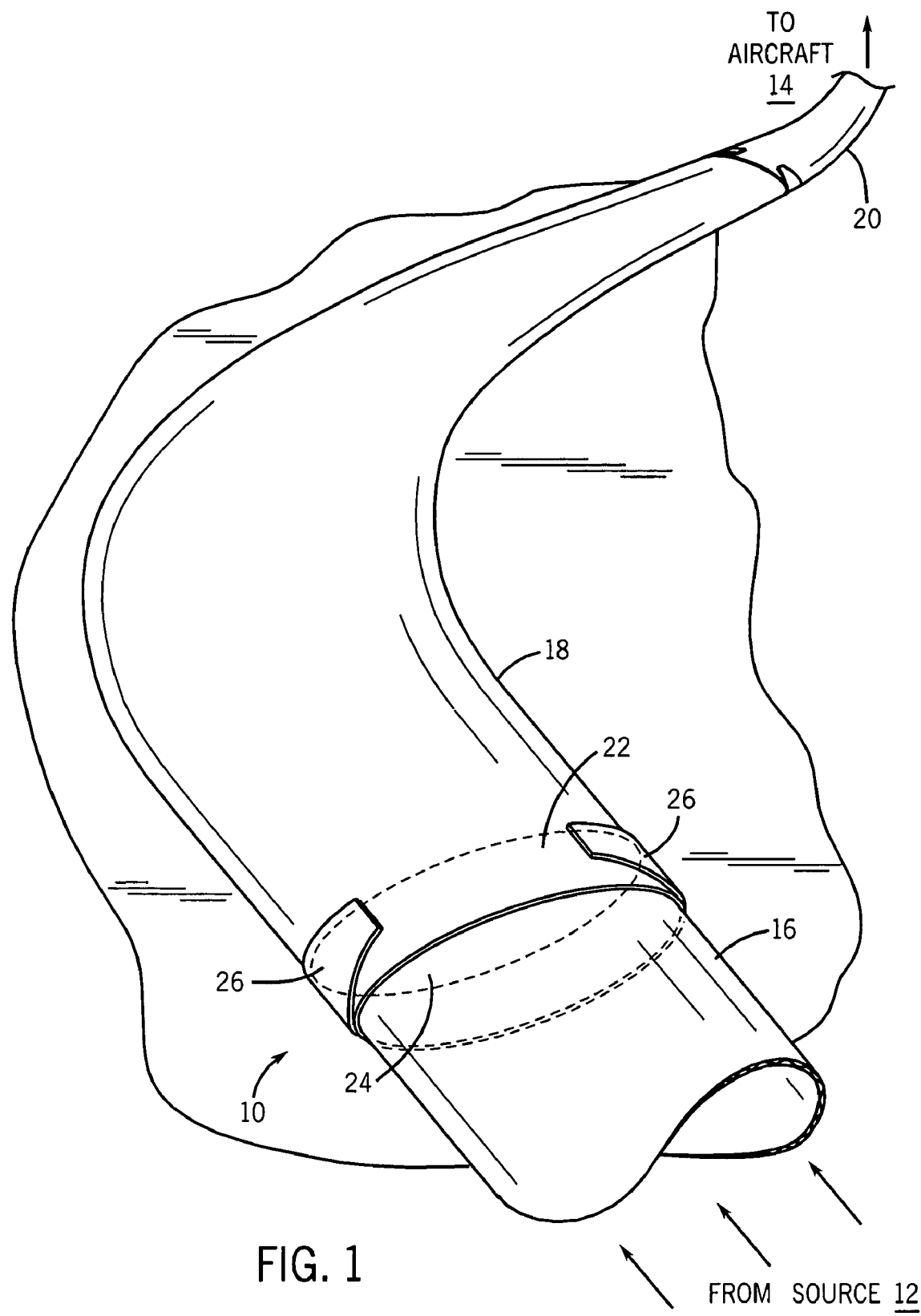
FIG. 1 is a perspective view of a series of conduit sections coupled to one another in accordance with aspects of the present technique.

Turning now to the drawings, and referring first to FIG. 1, a conduit system, designated generally by reference numeral 10 is illustrated for conveying preconditioned or fresh air from a source 12 to an aircraft outlet 14. The system comprises a series of conduit sections which may be secured to one another by similar and mating ends. In the illustration of FIG. 1, three such sections are shown, including a first section 16 (shown interrupted in the view of FIG. 1), a central section 18, and a third section 20 extending from section 18 (also shown interrupted in the figure). Each section of conduit includes a female end, which may be termed a connection end 22, and a male end, which may be termed an insertion end 24. As described more fully below, the connection end 22 is designed to open via integral bellows or wall portions that permit expansion of the connection end 22 to receive the insertion end 24. Tabs 26 on the connection end 22 permit the structure to be tightly closed, collapsing the bellows or wall sections as described more fully below.

Figure 2:
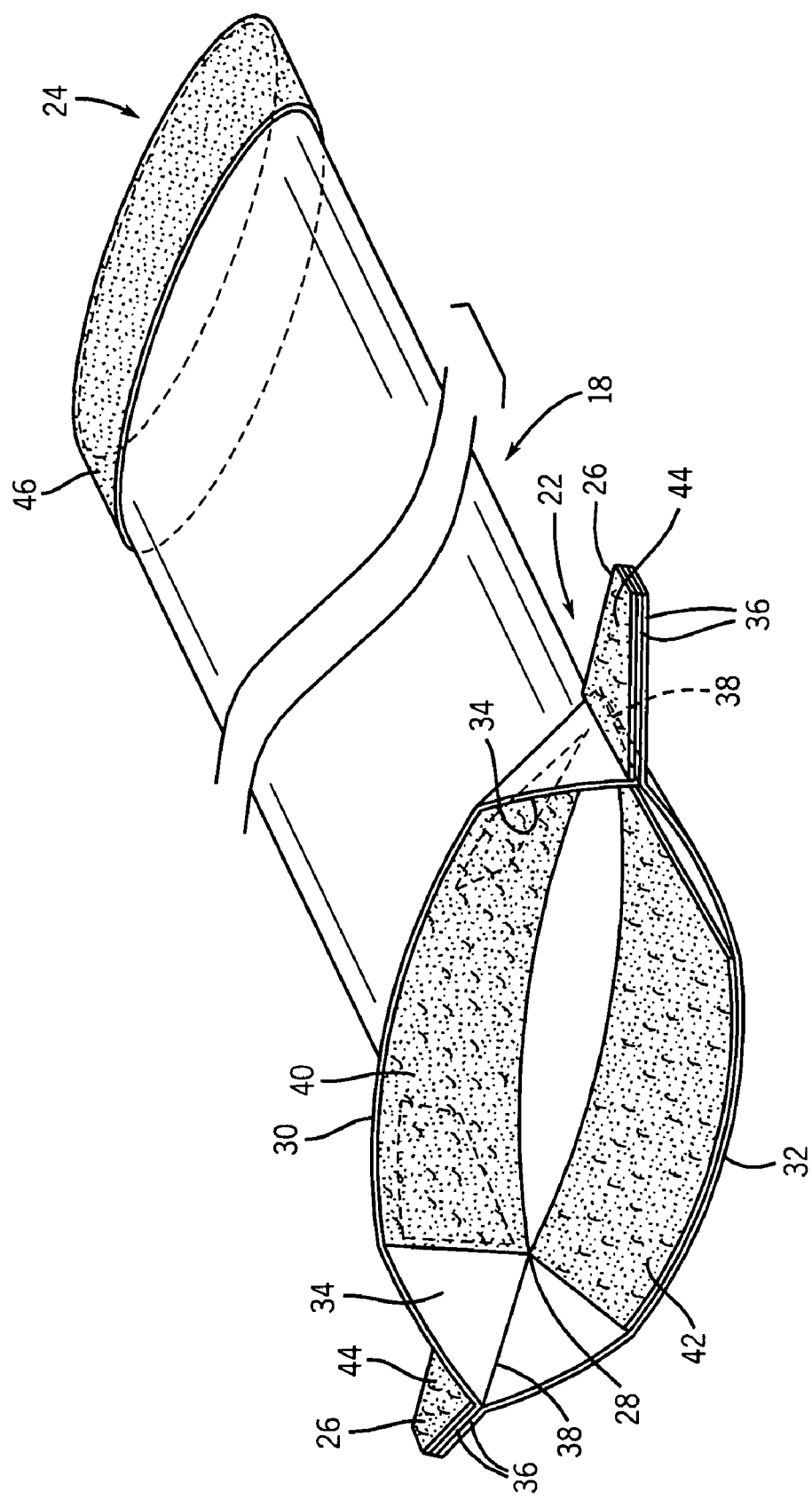
FIG. 2 is a perspective view of an exemplary conduit section according to the present technique with the female end shown open to receive a male end of a mating section, a similar male section being provided on an opposite end of the conduit section shown.

FIG. 2 illustrates one of the sections 18 shown in FIG. 1 in somewhat greater detail, including the construction of the mating ends. The conduit section generally includes a cylindrical body made of a robust and rugged fabric, such as plastic or plastic-coated fabric. The fabric utilized for the body of conduit section 18 may be generally identical to that employed in current aircraft fresh air conduits.

The female or connection end 22 of each conduit section forms a generally closed ring 28 that is contiguous with the cylindrical body. However, the closed ring 28 at the connection end includes expansion members in a sidewall that permit the end to be opened, exposing inner surfaces of flaps or sides 30 and 32. At their lateral extremities, sides 30 and 32 are joined by a gusset or bellows, or more generally by a sidewall portion 34 which permits the flaps to be separated from one another. Extensions 36 of the fabric that forms each side of the bellows 34 are sewn together to form the tabs 26 illustrated in FIG. 1. The bellows 34 thus presents a fold line 38 when opened as shown in FIG. 2. The entire structure may be thought of as a generally frustoconical arrangement with the sides or flaps 32 forming a cylinder continuing from the cylindrical body of the conduit section and the bellows 34 on either side of the flaps allowing the flaps to open, and expanding the diameter of the opening.

Within each side or flap 30 and 32, one portion of a hook-and-loop fastener material, designated generally by reference numerals 40 and 42 is sewn. While either the hook or the loop portion of the fastener material may be sewn within the sides 30 and 32, both materials 40 and 42 are identical in nature. That is, the material within sides 30 and 32 will not secure to itself. Moreover, while either the hook or the loop portion of the fastener system may be used for the side 30 and 32, it is preferable that the arrangement be back-compatible with existing conduit systems used for aircraft fresh air supplies. That is, the material used on sides 30 and 32 is the opposite type from that used on the male or insertion end of existing conduits, permitting use of the present technique with either older conduit sections or with the sections described here. Similar hook-and-loop fastener material 44 is secured on an exterior side of the tabs 26. As described more fully below, this material will permit closure of the female or connection end 22 by securement to mating material on an exterior surface of the female end.

An opposite end, which may be termed the male or insertion end 24 of the conduit section has a cylindrical configuration as shown in FIG. 2, when inflated by moving air. In a present embodiment, the male or insertion end 24 is a simple ring with a ring-like section of a hook-and-loop fastener material sewn around it as indicated at reference numeral 46. The material used for the male or insertion end 24 is the other of the hook-and-loop fastener system than that used on the female end sides (that is, for material 40 and 42). Moreover, in a presently preferred embodiment, the hook or loop material 46 is identical to the material used on conventional aircraft fresh air supply conduits.

Figure 3:
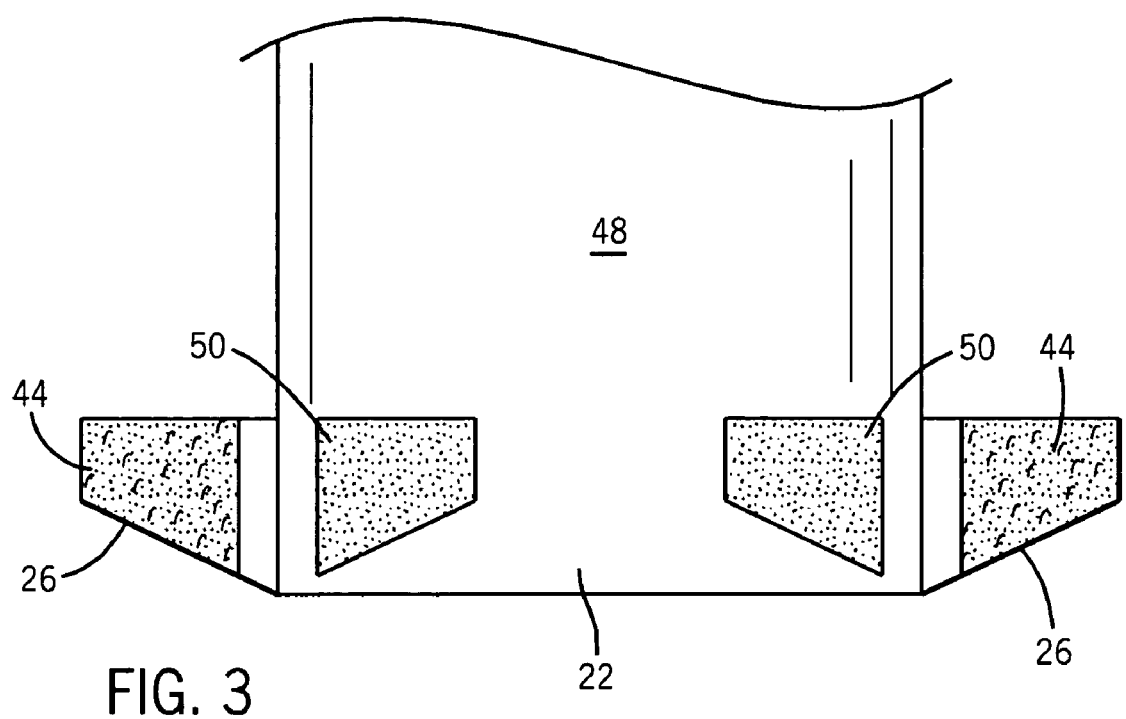
FIG. 3 is a plan view of a collapsed female end of the conduit of FIG. 2 showing extensions for closing the female end following assembly.

As illustrated in FIG. 3, the female or connection end 22 of each conduit section forms a tubular body 48 which may be fully collapsed by virtue of the flexibility of the material from which the body is made. While ribs or other rigidifying structures may be provided, a flat tube may be rolled or folded for convenience. It should be noted that the present technique may be used with other tube configurations, however, including reinforced tubes, semi-rigid tubes and tubes bearing various outer or inner features, such as for wear resistance.

Figure 4:
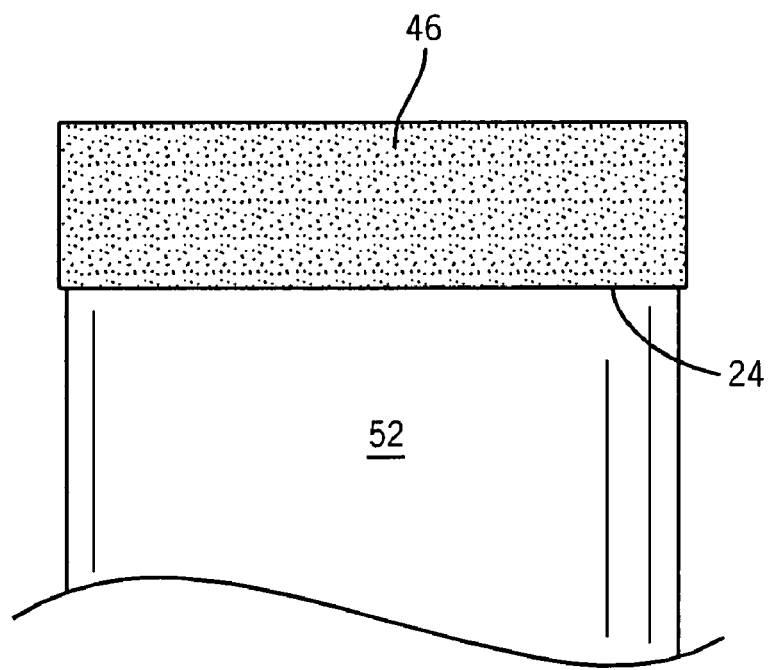
FIG. 4 is a similar plan view of the male end of the conduit section illustrating a ring-like section of hook-and-loop fastener material secured to the end.

As shown in FIG. 3, the female or connection end 22 includes the tabs 26 described above on an exterior surface of which the hook-and-loop fastener material 44 is sewn. An opposite type of hook-and-loop fastener material is sewn to an exterior surface of the tubular body 48 and configured to mate with the material on the tabs 26. As described more fully below, securement of the tabs to the exterior surface of the tubular body 48 thus permits the bellows of the closed ring of the female or connection end to be collapsed following insertion of the male end. As illustrated generally in FIG. 4, the conduit terminates at an opposite end 24 with a similar tubular body 52 which is the continuation of the tubular body 48 of FIG. 3. The hook-and-loop material 46 is sewn about the male or insertion end. In a present embodiment, the closure material 46 forms a complete ring, although partial rings or other multi-sectioned configurations may be envisaged.

Figure 5:
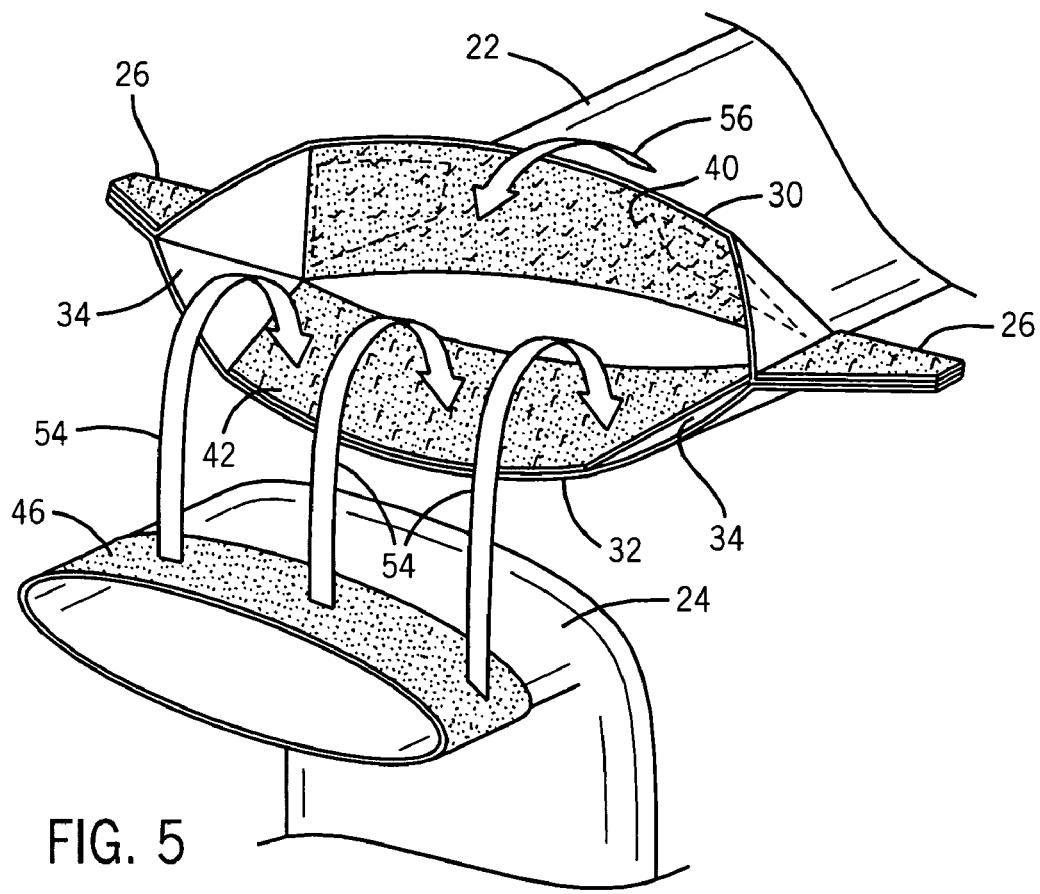
FIG. 5 is a perspective view of the female end of the conduit section of the previous figures following assembly with a mating male end.

FIG. 5 illustrates the assembly of the female and male ends of the type described above. In general, assembly begins with opening of the female end by separation of the sides 30 and 32 from one another. Such opening is possible by virtue of the bellows 34 that are integral with the closed ring of the female end. Separating the sides thus exposes the hook-and-loop fastener material 40 and 42. It should be noted that to facilitate assembly, the conduit may be laid flat on a support surface, such as the ground or tarmac. The mating hook-and-loop fastener material 46 of the male or insertion end 24 is then laid on top of the bottom side (32 in the illustration of FIG. 5) and the material is mated with the hook-and-loop fastener material of that side (material 42 in the view of FIG. 5). This mating, as indicated generally by arrows 54, effectively positions the male or insertion end within the female or connection end. The opposite side of the female or connection end may then be closed or pressed onto the male end, mating the hook-and-loop fastener materials of these two elements. Such closure is indicated generally by arrow 56 in FIG. 5.

It should be noted that in the present embodiment the lengths of the hook-and-loop fastener portions 40 and 42 of the female or connection end of the conduit sections, combined, is approximately equal to the circumference of the hook-and-loop fastener material of the male end. That is, once inserted into the female end as described above, the male end will be virtually completely secured by hook-and-loop fastener material to the flaps or sides 30 and 32 of the female end. Moreover, it should also be noted that extensions, adapters or other fabric or material elements may be included on either the female end or the male end, or both.

For example, the male end may include a fabric protrusion, which may be an extension of the tubular body itself, that channels air from the male end, past the connection made between the hook-and-loop fastener materials, and into the female end. That is, the hook-and-loop fastener material 46 of the male end may be positioned flush with the extremity of the tubular body or recessed from the end of the tubular body. Similar adapter materials or air-directing materials may be added to the structure on either the male end or the female end, or both.

Following assembly of the male or insertion end 24 into the female or connection end 22, the connection end may be completely closed to seal the arrangement by collapsing the bellows on either side of the sides or flaps 30 and 32. FIG. 6 illustrates the closure of the female or connection end by folding the flaps 26 onto the exterior surface of the female or connection end at the locations of the tab securement portions 50 made of the opposite type of hook-and-loop fastener material. Such securement, as indicated by arrows 58 in FIG. 6, effectively collapses or closes the bellows, and provides a robust and tight attachment of the conduit sections to one another.

As noted above, additional adaptations may be made based upon the securement arrangements described above. For example, FIG. 7 illustrates an adapter that may be configured for securement to a connector used to supply air to an aircraft. The construction of the adapter is essentially identical to that described above insomuch as it includes a female or connection end generally identical to that described above, and including tabs 26 for closure of the female or connection end around a male end of a mating conduit section. The adapter of FIG. 7, however, forms a tapered tube 60 that terminates, on a side opposite the female end, with a skirt 62. The skirt 62 may take any suitable form, and in the illustrated embodiment will be configured to fit snuggly around a connector 64. The connector 64 may be of any suitable type, and will generally include an extension 66 for receiving the adapter. In a presently contemplated configuration, a band or other constrictive means 68 can be secured around the skirt 62 when the elements are assembled as illustrated by arrow 70.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A conduit comprising:
   a tubular body;
   a connection end integral with the tubular body and forming a closed ring having a pair of opposed sides joined by integral collapsible bellows sections, each of the sides having a first type of hook-and-loop fastener material secured on an inner surface thereof; and
   an insertion end integral with the tubular body and having a second opposite type of hook-and-loop fastener material secured about an outer surface thereof for removably securing the insertion end within the connection end.

2. The conduit of claim 1, further comprising a pair of tabs extending from the collapsible bellows sections and closable about the connection end to collapse the bellows sections once the insertion end is removably secured within the connection end.

3. The conduit of claim 2, wherein each of the pair of tabs includes a first type of hook-and-loop fastener material, and an outer surface of the connection end includes portions of a second opposite type of hook-and-loop fastener material configured to mate with the material of the tabs to secure the tabs to the connection end and thereby to maintain the bellows sections in a collapsed configuration.

4. The conduit of claim 1, wherein the connection end forms a generally frustoconical section when the bellows sections are expanded.

5. The conduit of claim 1, wherein the second type of hook-and-loop fastener material forms a generally continuous ring about the insertion end.

6. The conduit of claim 1, wherein the second type of hook-and-loop fastener material is secured at an edge of the insertion end.

7. The conduit of claim 1, wherein a combined length of the first type of hook-and-loop fastener material of the opposed sides of the connection end is generally equal to a circumference of the second type of hook-and-loop fastener material of the insertion end.

8. A conduit comprising:
   a tubular body;
   a connection end integral with the tubular body and forming a closed ring having a opposed sides joined by an integral collapsible bellows section, sides having a first type of hook-and-loop fastener material secured on an inner surface thereof;
   an insertion end integral with the tubular body and having a second opposite type of hook-and-loop fastener material secured about an outer surface thereof for removably securing the insertion end within the connection end; and
   means for maintaining the collapsible bellows section in a collapsed configuration to close the connection end following securement of the insertion end therein by mating of the first and second hook-and-loop fastener materials.

9. The conduit of claim 8, wherein the connection end includes a pair of opposed sides separated by a pair of integral collapsible bellows sections to form the closed ring.

10. The conduit of claim 8, wherein the means for maintaining the collapsible bellows section in a collapsed configuration includes a flexible tab extending from the bellows section and foldable over the connection end.

11. The conduit of claim 10, wherein the flexible tab includes a first type of hook-and-loop fastener material secured to an outer surface thereof and the connection end includes a second opposite type of hook-and-loop fastener material secured to an outer surface thereof configured to mate with the material of the tab to hold the tab in contact with the connection end.

12. The conduit of claim 8, wherein the connection end forms a generally frustoconical section when the bellows section is expanded.

13. A conduit comprising:
   a tubular body;
   a connection end integral with the tubular body and forming a closed ring having a pair of opposed sides joined by integral collapsible bellows sections, each of the sides having a first type of hook-and-loop fastener material secured on an inner surface thereof and configured to mate with a second opposite type of hook-and-loop fastener material of a mating conduit.

14. The conduit of claim 13, further comprising a pair of tabs extending from the collapsible bellows sections and closable about the connection end to collapse the bellows sections about the mating conduit.

15. The conduit of claim 14, wherein each of the pair of tabs includes a first type of hook-and-loop fastener material, and an outer surface of the connection end includes portions of a second opposite type of hook-and-loop fastener material configured to mate with the material of the tabs to secure the tabs to the connection end and thereby to maintain the bellows sections in a collapsed configuration.

16. The conduit of claim 13, further comprising an insertion end integral with the tubular body and having a second opposite type of hook-and-loop fastener material secured about an outer surface thereof for removably securing the insertion end within the connection end.

17. The conduit of claim 13, wherein the connection end forms a generally frustoconical section when the bellows sections are expanded.

18. The conduit of claim 13, wherein a combined length of the first type of hook-and-loop fastener material of the opposed sides of the connection end is generally equal to a circumference of a second type of hook-and-loop fastener material of the mating conduit.

19. The conduit of claim 13, wherein the tubular body forms an adapter of progressively reducing diameter.

20. The conduit of claim 13, wherein the tubular body terminates in a skirt at an end opposite the connection end configured for securement to a connector.

* * * * *